United States Patent Office 3,661,987
Patented May 9, 1972

---

3,661,987
PRODUCTION OF MUCOBROMIC ACID
Helmut Schlecht, Ludwigshafen, Germany, assignor to Badische Anilin- & Soda-Fabrik Aktiengesellschaft, Ludwigshafen (Rhine), Germany
No Drawing. Filed Nov. 4, 1969, Ser. No. 874,062
Claims priority, application Germany, Nov. 20, 1968, P 18 09 947.3
Int. Cl. C07c 51/32
U.S. Cl. 260—530 R      8 Claims

---

ABSTRACT OF THE DISCLOSURE

Production of mucobromic acid by reaction of furfurol with bromine in the presence of nitric or nitrous acid. The product is a starting material for the production of dyes and plant protection agents.

---

The invention relates to a process for the production of mucobromic acid by reaction of furfurol with bromine in the presence of nitric acid or nitrous acid.

It is known from Berichte de Deutschen Chemischen Gesellschaft, 32, 2085, that mucobromic acid can be prepared by reaction of 1 mole of furfurol with at least 5 moles of bromine in the presence of water. The method is generally carried out with an excess of bromine and is therefore uneconomical, particularly on an industrial scale. The hydrogen bromide formed in the reaction may be collected and regenerated into bromine, for example with chlorine, but this procedure is troublesome and involves additional expense.

It is also known that when mucobromic acid is heated with dilute nitric acid, dibromomaleic acid is formed (loc. cit., 13, 738) and that when nitrite acts on mucobromic acid, nitromalondialdehyde is formed (loc. cit., 15, 1908), from which is aqueous acid solution, formic acid and trinitrobenzene are formed (American Chemical Journal, 22, 89).

It is an object of this invention to provide a new process for the production of mucobromic acid in a more economical and simpler way and in better yields and purity.

This and other objects of the invention are achieved and mucobromic acid is advantageously obtained by reaction of furfurol with bromine in the presence of water by carrying out the reaction in the presence of nitric acid or nitrous acid.

When nitric acid is used, the reaction may be represented by the following equation:

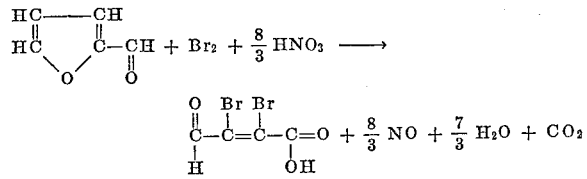

As compared with prior art methods, the process in accordance with the invention gives in a more economical and simpler manner mucobromic acid in better yields and higher purity without substantial formation of byproducts, for example nitromalondialdehyde, dibromaleic acid, trinitrobenzene and formic acid. The reaction proceeds at a higher velocity and can be carried out at a lower temperature; the mother liquor from the reaction after mucobromic acid has been separated contains less byproducts and may be used for further batches. These results are surprising having regard to the state of the art.

The starting materials furfurol and bromine are used as a rule in stoichiometric amounts so that the whole of the amount of bromine serves in an economical manner for the synthesis of the mucobromic acid molecule. Compounds which form bromine under the reaction conditions, for example hydrobromic acid, may be used instead of bromine but advantageous only part of the bromine is replaced by such substances. The reaction is carried out in the presence of water, generally in an amount of from 20 to 350 moles, and in the presence of nitric or nitrous acid, generally in an amount of 1 to 3 moles, particularly 1.5 to 2.7 moles, in each case with reference to 1 mole of furfurol. Substances which form nitric or nitrous acid during the reaction, for example nitrous gases together with the water, may be used instead of the said acids. By passing oxygen or gas containing oxygen, for example air, into the reaction mixture, nitrogen monoxide formed during the reaction may be oxidized to nirtogen dioxide which forms nitrous acid or nitric acid with water. In this preferred embodiment, the acids may be continuously regenerated in a particularly advantageous way and the use of acids substantially reduced.

The reaction is carried out at a rule at a temperature of from 80° to 130° C., preferably from 85° to 95° C., at atmospheric or superatmospheric pressure, continuously or intermittently. Preferred embodiments of the process are for example as follows:

Aqueous hydrobromic acid and bromine are placed in a stirred vessel and furfurol and nitric or nitrous acid are allowed to flow in at the reaction temperature. Alternatively only a portion of the bromine required may be placed in the vessel and the remainder run in with the other reactants. Oxygen or air is passed through the reaction mixture at the same time. The concentration of hydrogen bromide in the reaction mixture is advantageously from 20 to 50% by weight, preferably 40% by weight, and the concentration of free bromine is advantageously from 2 to 10% by weight. The rate at which furfurol is fed in depends on the reaction velocity; it may be for example 1 part by weight of reaction mixure during eight hours.

After the bromination is over, for example from half to one hour after the whole of the furfurol has been added to the reaction mixture, the latter is cooled to about 20° C.; mucobromic acid crystallizes out. This is separated by filtration or centrifuging. The mother liquor may be reused for the next batch.

The process may also be carried out continuously. It is advantageous to use an apparatus in which the reaction mixture is recycled. The reactants are supplied continuously and the reaction mixture is continuously withdrawn. After mucobromic acid has been separated, the remaining mother liquor is returned to the cycle.

In order to avoid loss of bromine in the offgas, the offgas may be strongly cooled or washed with water. The use of mother liquor as the wash liquid has proved to be particularly advantageous. The offgas may be allowed to flow through a packed column while the mother liquor flows countercurrent. This mother liquor has a particularly good solvent power for bromine due to its high content of hydrogen bromide. It is advantageous to keep the lower portion of the packed column at elevated temperature. Any nitrogen dioxide present in the offgas then reacts with the hydrogen bromide in the mother liquor to form nitric oxide and bromine. The bromine dissolves in the mother liquor and is recycled into the reaction mixture.

Mucobromic acid obtainable by the process according to the invention is a valuable starting material for the production of dyes and plant protection agents. As regards use, for example of pyridazones which can be prepared therefrom, references is made to U.S. Pat. 3,045,014 and British Pats. 871,674, 1,086,614, 1,131,473, 1,128,302 and 1,130,716.

The following examples illustrate the invention. The parts specified are by weight.

EXAMPLE 1

(a) 1,000 parts of 40% by weight aqueous hydrobromic acid and 90 parts of bromine are placed in a stirred vessel and heated to 90° C. 96 parts of furfurol, 90 parts of bromine and 155 parts of 65% by weight nitric acid are run uniformly into the same during eight hours through tubes which dip into the reaction mixture. Through the tube in which the furfurol is supplied, 15 parts of air per hour is passed in at the same time.

The offgas is passed through a Raschig ring column to the top of which 63 parts of 43% by weight aqueous hydrobromic acid is supplied per hour. The lower half of the column is kept at 90° C. The mixture flowing away from the column is passed into a stirred vessel. The offgas leaves the column devoid of bromine.

After the bromination is over, the reaction vessel is cooled to 20° C. so that mucobromic acid crystallizes out. The end product is suction filtered and washed with a little water. 180 parts of pure mucobromic acid is obtained (equivalent to 70% of the theory); it has a melting point of 121° to 124° C.; 1,600 parts of mother liquor is also obtained.

(b) 1,000 parts of the mother liquor and 90 parts of bromine are charged into the stirred vessel for the next batch. The mixture is heated to 90° C. and as in the first batch 96 parts of furfurol, 90 parts of bromine and 155 parts of 65% by weight aqueous nitric acid are run in during eight hours. At the same time 15 parts of air per hour is passed in. 63 parts of mother liquor is allowed to flow per hour into the Raschig ring column. Further reaction is carried out as in the first batch.

230 parts of crystallized mucobromic acid is obtained, a yield of 89% of the theory with reference to the furfurol used.

EXAMPLE 2

For the continuous production of mucobromic acid, an apparatus is used consisting of two vertical tubes connected together at the top and bottom by two horizontal lengths of tubing. The ascending arm of the apparatus can be heated and has at the bottom an inlet pipe for bromine and nitric acid and above this an inlet pipe for furfurol. An outlet for reaction mixture is provided in the descending arm. An outlet for offgas is provided at the upper end of the apparatus.

The apparatus is filled with 3,000 parts of aqueous mother liquor from an earlier batch which contains 150 parts of mucobromic acid and 1,050 parts of hydrogen bromide. 105 parts of bromine, 110 parts of 65% nitric acid and 48 parts of furfurol are passed in per hour at 90° C. At the same time, 13 parts per hour of air is allowed to flow in through each of the inlet pipes. The reaction mixture circulates at a rate of about 230,000 parts per hour. The offgas which contains nitrogen, oxides of nitrogen and bromine is strongly cooled. The condensate thus obtained is allowed to flow back into the apparatus. 780 parts of reaction mixture is removed per hour from the apparatus. The free bromine still contained therein is completely reacted by adding an appropriate amount of furfurol (about 4 parts per hour). The reaction mixture is then cooled to 20° C. while stirring. Mucobromic acid thus crystallizes out and is separated and dried. 120 parts of mucobromic acid having a melting point of from 122° to 124° C. (89% of the theory with reference to furfurol used). The mother liquor which remains is continuously recycled.

I claim:

1. A process for the production of mucobromic acid which comprises reacting furfurol with bromine at a temperature of about 80° C. to 130° C. and in the presence of from 20 to 350 moles of water and 1 to 3 moles of nitric acid or nitrous acid, said molar amounts being with reference to 1 mole of furfurol.

2. A process as claimed in claim 1 carried out in the presence of from 1.5 to 2.7 moles of nitric acid or nitrous acid with reference to 1 mole of furfurol.

3. A process as claimed in claim 1 carried out with the simultaneous introduction of oxygen or gas containing oxygen into the reaction mixture.

4. A process as claimed in claim 1 carried out at a temperature of from 85° to 95° C.

5. A process as claimed in claim 1 carried out with a hydrogen bromide concentration of from 20 to 50% by weight in the reaction mixture.

6. A process as claimed in claim 1 carried out with a hydrogen bromide concentration of 40% by weight in the reaction mixture.

7. A process as claimed in claim 1 carried out with a concentration of free bromine in the reaction mixture of from 2 to 10% by weight.

8. A process as claimed in claim 1 wherein said furfurol and bromine are reacted in approximately stoichiometric amounts.

References Cited

UNITED STATES PATENTS 2,821,553   1/1958   Dunlop et al. _____ 260—539

OTHER REFERENCES

Rapos et al., Chem. Abstr., vol 70, 57169m.
Kuh et al., Chem. Abstr., vol. 49, 7493d.
Reichenender et al., Chem. Abstr., vol 60, 2778f.
Kogan et al., Chem. Abstr., vol. 69, 43458F.
Shono et al., Chem. Abstr., vol. 60, 2779d.

LORRAINE A. WEINBERGER, Primary Examiner

R. D. KELLY, Assistant Examiner